(12) United States Patent
Venkatesh et al.

(10) Patent No.: US 7,593,459 B1
(45) Date of Patent: Sep. 22, 2009

(54) WIRELESS LINK SIMULATOR

(75) Inventors: Narasimhan Venkatesh, Hyderabad (IN); Ravikumar Neerudu, Khammam (IN); Ponnamanda Venkata Chandra Sekhar, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 588 days.

(21) Appl. No.: 11/226,620

(22) Filed: Sep. 14, 2005

(51) Int. Cl.
*H04B 3/46* (2006.01)

(52) U.S. Cl. .................. 375/224; 375/220; 375/222; 375/226; 375/227

(58) Field of Classification Search ............... 375/224, 375/220, 222, 226, 227
See application file for complete search history.

(56) References Cited

U.S. PATENT DOCUMENTS

| | | | |
|---|---|---|---|
| 6,308,064 B1 | 10/2001 | Green | |
| 6,397,062 B1 | 5/2002 | Sessions | |
| 6,542,538 B2 | 4/2003 | Fischel et al. | |
| 6,553,087 B1 * | 4/2003 | Alelyunas et al. | 375/357 |
| 6,571,082 B1 | 5/2003 | Rahman et al. | |
| 6,724,730 B1 | 4/2004 | Mlinarsky | |
| 7,013,257 B1 * | 3/2006 | Nolan et al. | 703/28 |
| 2003/0236089 A1 | 12/2003 | Beyme | |

* cited by examiner

*Primary Examiner*—Shuwang Liu
*Assistant Examiner*—Kabir A Timory
(74) *Attorney, Agent, or Firm*—File-EE-Patents.com; Jay A. Chesavage

(57) ABSTRACT

A wireless link simulator includes, in sequence, a digital transmit device under test (TX-DUT), a wireless link simulator, and a digital receive device under test (RX-DUT). The wireless link simulator includes, in sequence, a transmitter IQ imbalance generator, a power amplifier non-linearity generator, a noise floor generator, a multi-path channel generator, a receive noise generator, a frequency offset generator, a phase noise generator, a receive IQ imbalance generator, and a DC offset generator. Each of the generators may be individually varied to determine the receiver sensitivity to each of these effects and associated parameters.

24 Claims, 7 Drawing Sheets

Wireless Link Simulator

TX IQ Imbalance Generator

PA Non-Linearity Generator

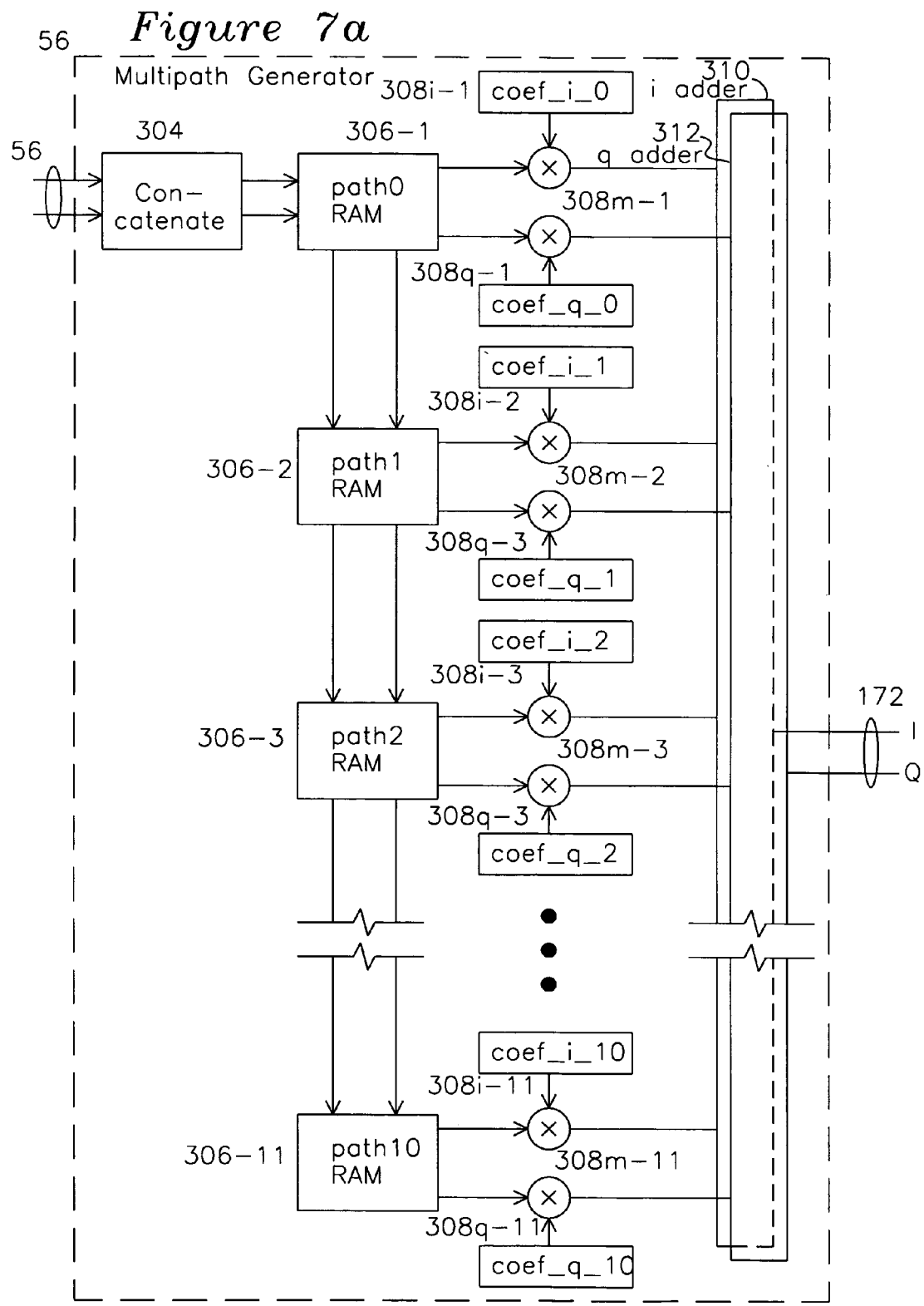

RMS delay spread 600ns
Maximum excess delay: 2400ns

RMS delay spread 300ns
Maximum excess delay: 1600ns

RX Noise Generator

RX Frequency Offset Generator

Rx Phase Noise Generator

RX IQ Imbalance Generator

RX DC Offset Generator

WIRELESS LINK SIMULATOR

FIELD OF THE INVENTION

The present invention is related to the testing of wireless systems. More particularly, the invention is related to wireless systems which include a transmitter part performing encoding of digital data followed by modulation and transmission onto a wireless channel, and a receiver part which receives signals from a wireless channel and performs detection, demodulation, and decoding of digital data.

BACKGROUND OF THE INVENTION

There are several prior art techniques for measuring the performance of a receiver signal processing system for a wireless link.

FIG. 1 shows a prior art signal processing system for a wireless transmitter 11 and receiver 21. The transmitter 11 includes a digital transmit device under test (TX-DUT) 10 which performs the encoding and modulation of data to be transmitted, inclusive of all digital functions of the wireless transmitter up to the generation of quadrature digital data for transmission 13, as is ordinarily performed in wireless signal processing of the prior art, such as the wireless LAN protocols of IEEE 802.11a, 802.11b, 802.11g, or any of the prior art wireless transmission systems. The TX-DUT 10 delivers quadrature baseband data 13 to a digital to analog converter (DAC) 12, which accepts a quadrature digital data stream suitable for modulation to a carrier frequency. The transmit RF function 14 sums the baseband analog signals from the DAC 12, modulates them to a carrier frequency such as 2.4 Ghz or 5 Ghz, amplifies the modulated signal, and couples the amplified signal to an antenna 16. A communications channel 26 carries the transmitted signals to a receiver antenna 18, which disposes the received signal to an RF baseband converter 20, which may typically include a quadrature mixer for baseband demodulation and delivery of the I and Q channels to a pair of analog to digital converters 22 which output quadrature or single ended digital data 28, which is then applied to a digital receiver signal processor RX-DUT 24. RX-DUT 24 performs the digital operations of demodulating and decoding the data stream into received data. The functional block separations shown are according to type of processing performed, and include digital processors 10 and 24, D/A and A/D converters 12 & 22, and analog RF functions 14 & 20. There are many different systems of encoding/decoding, modulation/demodulation, and these systems form the basis for the various standards of the IEEE LAN group, and many other standards-based and non-standards based communications systems.

When a particular TX-DUT or RX-DUT is to be tested, the communications channel 26 becomes an integral part of the system test result. For example, an RX-DUT 24 for 802.11b may include a sophisticated rake receiver which is effective in reducing the effects of multi-path reflections in communications channel 26, but this performance improvement may not be observed if the noise performance of the RF baseband converter 20 is poor, the incoming signal is weak, or if the communications channel 26 includes time-dependant phase shifts which are not tracked by the phase rotation correction function of the RX-DUT 24. The performance of the RX-DUT 24 is thereby limited by the performance of the systems surrounding it, and the interactions of these may become very difficult to separate and isolate when analyzing the performance of RX-DUT 24 or TX-DUT 10. Additionally, tests of the RX-DUT 24 and TX-DUT 10 in the field may produce different results due to the particular effects present at the time a particular test was performed. It is desired to conduct performance evaluations of the TX-DUT 10 and RX-DUT 24 in such a way as to include the effects of the DAC 12, transmit RF functions 14, communications channel 26, RF baseband converter 20, and ADCs 22 in a reliable, repeatable manner. It is further desired to be able to simulate the effect of a single change in performance of DAC 12, transmit RF functions 14, communications channel 26, receive RF functions 20 and ADC 22 on the TX-DUT and RX-DUT.

U.S. Pat. No. 6,308,064 by Green describes a testing system for interconnecting wireless systems to a plurality of antennas placed with a variety of separations and reflective structures, where each of the antennas are individually selectable as part of the testing methodology. In this manner, the communications channel may be modeled through the placement of antennas.

U.S. Pat. No. 6,542,538 by Fischel et al describes a method for testing a wireless link by transmitting a pseudo-random number sequence across the link, whereby the receiver synchronizes to the pseudo-random link to test for received errors.

U.S. Pat. No. 6,571,082 by Rahman et al describes a test simulator for modeling the effects of multi-path, attenuation, and doppler shift on a signal, where the test simulator is placed in the wireless RF receive path of a receive signal processor used in a wireless link.

U.S. Pat. No. 6,724,730 by Mlinarsky et al describes a test system whereby the transmitter and receiver are coupled with an RF link, and the simulator is placed in the wireless link between the transmitter signal processing and receive signal processing, where the simulator includes variable attenuation, and a multi-path and doppler simulator.

U.S. patent application Ser. No. 2003/0236089 describes a test system for cellular wireless systems, whereby the received signal is converted to baseband prior to sequential processing by modules which provide channel simulation for use to a plurality of devices under test.

OBJECTS OF THE INVENTION

A first object of the invention is a system for simulating a wireless link.

A second object of the invention is a system for simulating a wireless link which includes the effects of a transmit DAC and RF functions.

A third object of the invention is a system for simulating a wireless link which includes the effects of a receive RF amplifier and a receive ADC.

A fourth object of the invention is a system for simulating a wireless link which accepts single-ended or quadrature baseband digital data from a TX-DUT and generates simulated single-ended or quadrature baseband digital data for delivery to an RX-DUT.

A fifth object of the invention is a system for simulating a communications system which includes a wireless link sending and receiving baseband data which has been up-converted to a modulation frequency by providing a succession of baseband signal processing steps which simulate the effects of the wireless link between a transmitter under test and a receiver under test.

SUMMARY OF THE INVENTION

The digital functions of a wireless receiver/transmitter link includes two parts: a digital transmitter device under test (TX-DUT) 10 part which modulates transmit data into a stream of quadrature TX-DUT data 13, and a digital receiver device under test (RX-DUT) 24 part which accepts and demodulates a stream of RX-DUT data 28. A wireless link simulator 44 includes an input interface 82 for receiving data from the TX-DUT and an output interface 284 for sending data to an RX-DUT. The input interface 82 accepts an analytic signal comprising a digital signal having an in-phase component (I), and a quadrature (Q) component from a TX-DUT 10, such signal as would ordinarily be delivered by a TX-DUT to the digital to analog converter (DAC) subsystem of a wireless transmitter. The output interface of the wireless link simulator 44 generates an analytic signal 284 comprising a digital signal having an in-phase component (I), and a quadrature (Q) component, as would ordinarily be generated by the analog to digital converter (ADC) 22 subsystem of the wireless receiver of FIG. 1, and this signal is delivered to an RX-DUT 24. FIG. 2 shows that the link simulator 44 of the present invention extracts the analytic signal 82 prior to a transmitter DAC, simulates the electrical behavior of the communications link as well as the DAC 12 and RF transmit functions 14 of the transmitter and the RF baseband converter 20 and ADC 22 functions of a receiver 21, and generates an analytic digital signal which is delivered to the digital receiver signal processor 24 of the device under test. The wireless link simulator 44 includes a TX IQ Imbalance Generator 50, a Power Amplifier (PA) Non-linearity Generator 52, a TX Noise Floor Generator 54, a Multi-path Channel Generator 56, an Rx Thermal Noise Generator 58, a Frequency Offset Generator 60, a Phase Noise Generator 62, an RX IQ Imbalance Generator 64, and a DC Offset Generator 66. Each of the generator elements of the wireless link simulator 44 includes provision for changing the behavior for each element.

BRIEF DESCRIPTION OF THE DRAWINGS

FIG. 7*a* shows the block diagram for a multi-path generator.

DETAILED DESCRIPTION OF THE INVENTION

Figure 1:
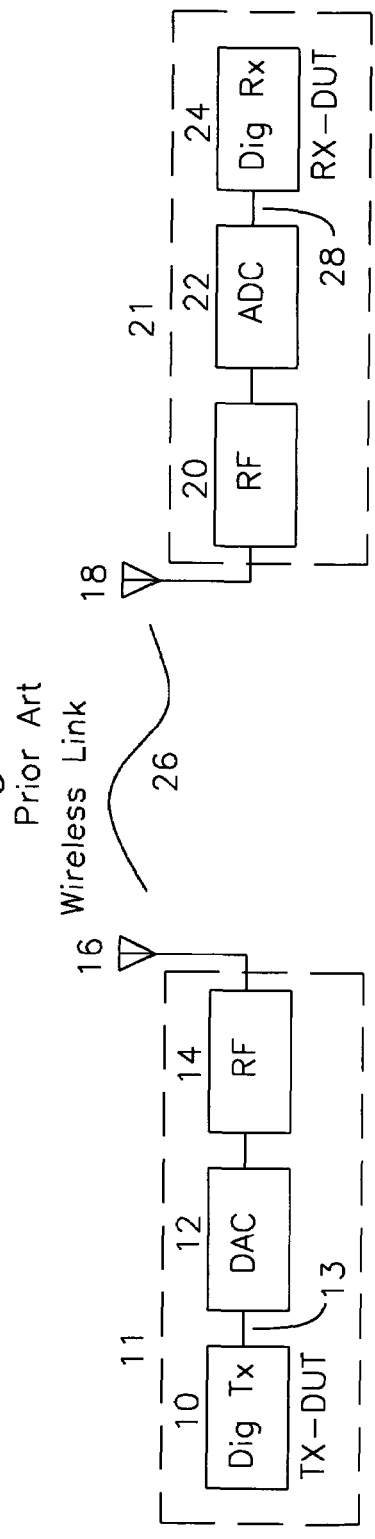
FIG. 1 shows the block diagram for a prior art wireless link.

FIG. 1 shows the prior art wireless communications system, including transmitter 11, which includes a digital transmit device under test TX-DUT 10 generating quadrature digital transmit data on TX-DUT transmit interface 13, a DAC 12 for converting this to an analog signal for up-conversion and amplification by RF functions 14, and coupling to an antenna 16. Wireless receiver 21 includes an antenna 18 for receiving signals received from a communications channel 26 and coupling them to an RF amplifier and down-converter 20, whose quadrature output 28 is sampled by ADC 22 for delivery of a stream of digital data to a digital receiver device under test RX-DUT 24.

Figure 2:
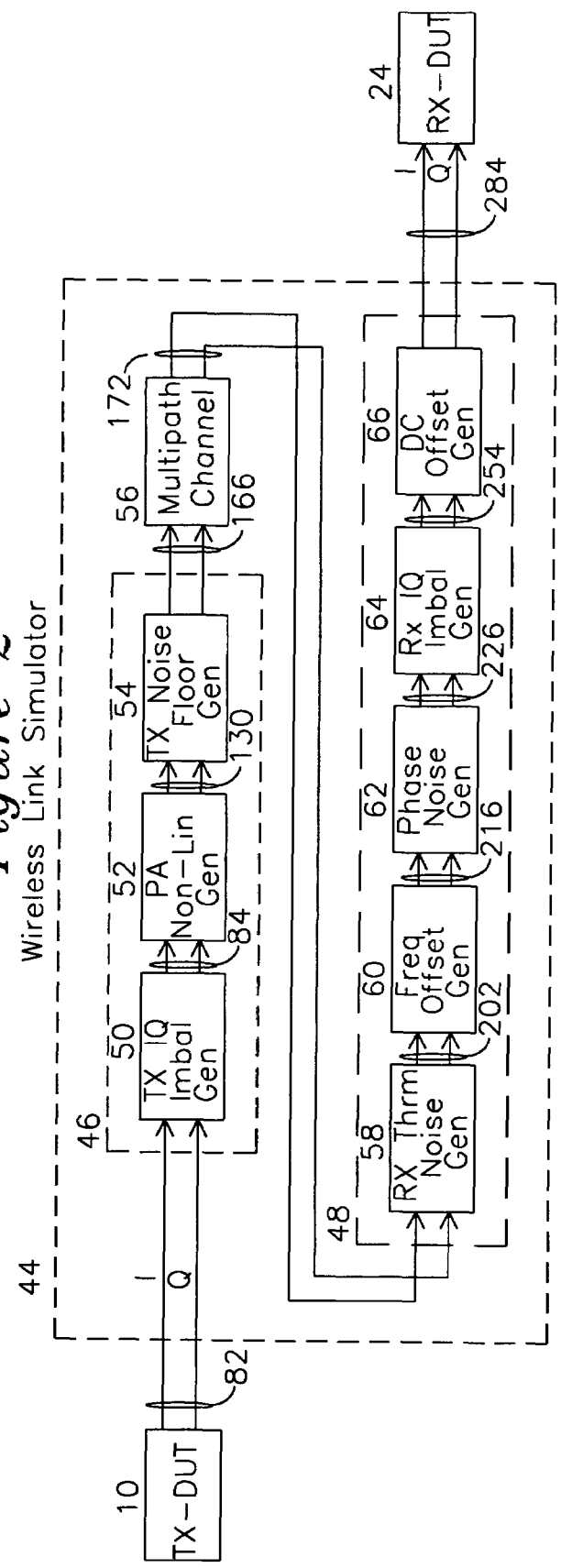
FIG. 2 shows the block diagram for a wireless link simulator.

FIG. 2 shows the wireless link simulator 44, which accepts quadrature TX-DUT digital data 82 from the TX-DUT 10, and processes them with a TX processor 46, which simulates the behavior of the DAC 12 and transmit RF subsystem 14 of FIG. 1 and produces a simulated transmit signal 166 which has similar characteristics at baseband as the modulated signal at a carrier frequency such as 2.4 Ghz or 5 Ghz delivered through the communications channel 26 of FIG. 1. The simulated transmit signal 166 is then provided to a multi-path channel generator 56 which simulates the multi-path reflection and attenuative behavior of the communications channel 26 of FIG. 1, and finally to a receive processor 48 which simulates the behavior of the RF subsystem 20 and ADC subsystem 22 of the receiver 21 of FIG. 1. In this manner, the transmitter characteristics (12 & 14), the communications channel characteristics 26, and the receiver characteristics (20 & 22) may all be modeled while performing the modeling operations using digital circuitry which operates on a baseband signal, rather than modulating and demodulating the signal to/from a rate of 2.5 Ghz or 5 Ghz, thereby greatly reducing the computational complexity required, and affording the use of standard digital processing techniques. FIGS. 3 through 6 show the generation of transmit non-idealities for the transmit processor 46 of FIG. 2. FIG. 7*a* shows the channel simulator which models communications channel 26 of FIG. 1, and FIGS. 8 through 12 show the elements of receiver non-idealities of receive processor 48 of FIG. 2.

Figure 3:
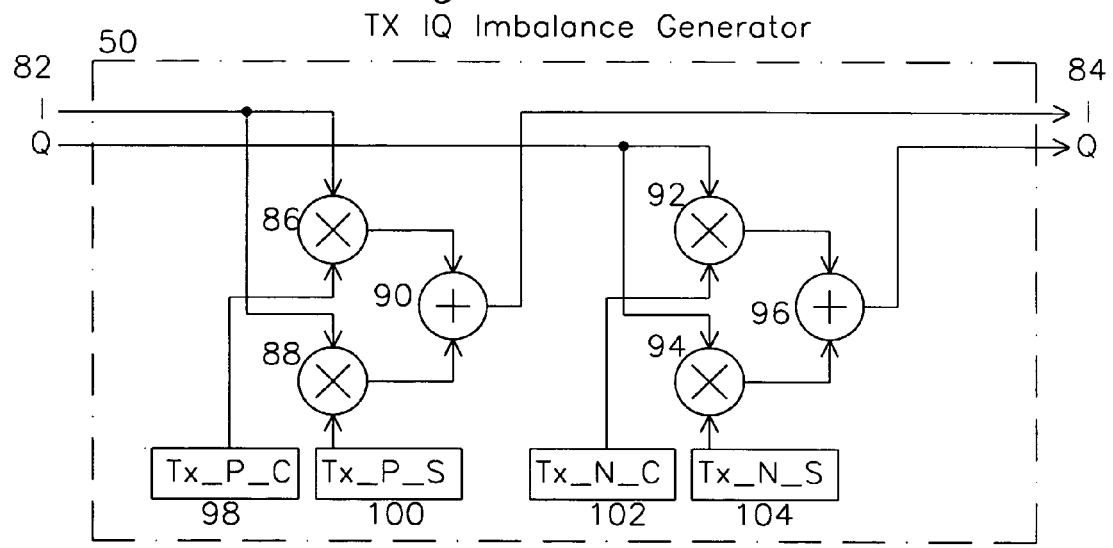
FIG. 3 shows the block diagram for a TX IQ Imbalance generator.

FIG. 3 shows a transmit IQ imbalance generator 50, which modifies the gain and phase of the I and Q channels of the signal transmitted through the link simulator. The I and Q channels of the signal stream 82 are ideally generated with a 90 degree phase separation, and the two channel gains are ideally gain matched to each other. The transmit IQ imbalance generator 50 creates gain and phase imbalances which simulate the effects of degraded channels. The I signal from quadrature input signal stream 82 is applied to I channel multipliers 86 and 88, multiplied by imbalance generator coefficients Tx_Positive_Cosine 98 (Tx_P_C) and Tx_Positive_Sine 100 (Tx_P_S), and the multiplier 86 and 88 outputs are summed 90 to generates the I output of 84. Similarly, The Q quadrature input signal 82 is applied to Q channel multipliers 92 and 94, is multiplied by imbalance generator coefficients Tx_Negative_Cosine 102 (Tx_N_C) and Tx_Negative_Sine 104 (Tx_N_S), and the multiplier 92 and 94 outputs are summed 96 to generates Q output 84. The values of coefficients TX_P_C 98, TX_P_S 100, TX_N_C 102, and TX_N_S 104 can be computed from the values of Phase_imbalance and Gain_imbalance as follows:

tx_pos_cos_pos_gain =
$$\cos\left(\frac{\text{Phase\_imbalance}(deg) \times \pi}{360}\right) \times 10^{0.025 \times \text{Gain\_imbalance}(dB)} \times 2\wedge 6$$

tx_pos_sin_neg_gain =
$$\sin\left(\frac{\text{Phase\_imbalance}(deg) \times \pi}{360}\right) \times 10^{-0.025 \times \text{Gain\_imbalance}(dB)} \times 2\wedge 6$$

-continued $$tx\_neg\_sin\_pos\_gain =$$
$$\text{Sin}\left(\frac{-\text{Phase\_imbalance}(deg) \times \pi}{360}\right) \times 10^{0.025 \times \text{Gain\_imbalance}(dB)} \times 2^{\wedge}6$$

$$tx\_neg\_cos\_neg\_gain =$$
$$\text{Cos}\left(\frac{-\text{Phase\_imbalance}(deg) \times \pi}{360}\right) \times 10^{-0.025 \times \text{Gain\_imbalance}(dB)} \times 2^{\wedge}6$$

Figure 4:
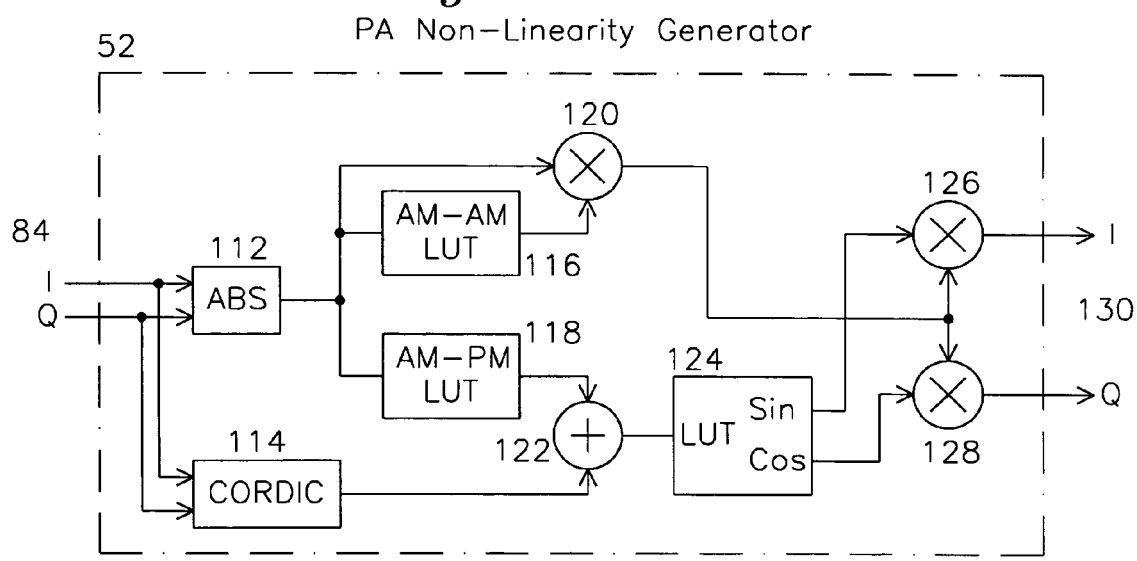
FIG. 4 shows the block diagram for a PA non-linearity generator.

FIG. 4 shows a Power Amplifier Non-linearity processor 52, which simulates the non-linear behavior of the transmit power amplifier part of transmit RF function 14 of FIG. 1. Often in power amplifiers, the incremental gain is reduced at high power levels compared to lower power levels, an effect known as compression, which results in the generation of undesired harmonic products. The compression effect tends to reduce the spectral energy in the desired modulation region, and also generates spurious mixing products, which both degrade the linearity of the processing, as well as reduce the operating efficiency of the amplifier. There are many ways of realizing the power amplifier nonlinearity generator 52 of FIG. 4, and the method shown in FIG. 4 involves separating the phase and magnitude of the signal into magnitude and phase components, shown as absolute value generator 112 and CORDIC function 114, respectively. The magnitude component of the input signal is multiplied 120 by a magnitude-dependant factor derived from a lookup table (LUT) 116, thereby generating the amplitude compression effect. The phase of the input signal is added 122 with a phase component related to the magnitude derived from phase lookup table (LUT) 118. The phase output of adder 122 is sent through a lookup table (LUT) 124 which generates a sine part and a cosine part, and these are respectively multiplied by the correction term magnitude output of 120 by multipliers 126 and 128, thereby generating an I and Q component which represent the non-linearity of the transmit power amplifier 14 of FIG. 1, or any other nonlinear effect that may be desired. The coefficients for the non-linearity are loaded into lookup tables 116, 118, and 124.

Figure 5:
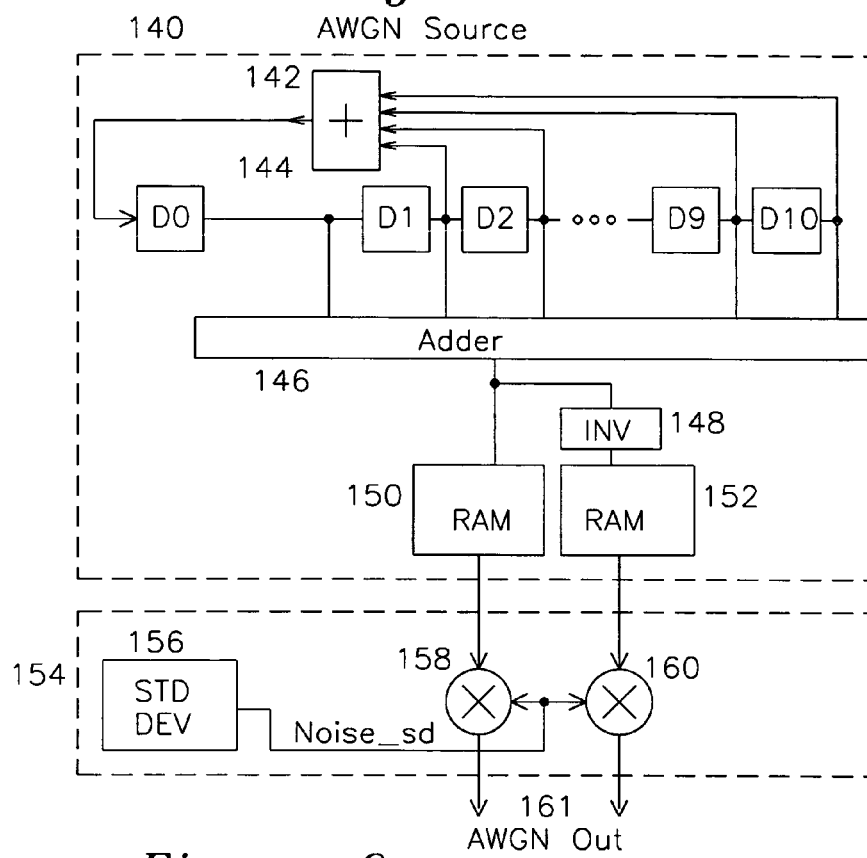
FIG. 5 shows the block diagram for an AWGN source.

FIG. 5 shows an average white gaussian noise (AWGN) source 140, which may be realized in any manner that generates a quadrature noise source 161. The Pseudo Noise (PN) source 140 comprises a linear feedback shift register comprising LFSR adder 146 which sums the individual outputs of registers D0 through D10, which receive an input term at D0 from adder 142. The outputs of the LFSR adder 146 are fed to address inputs of a RAM 150 via inverter 148 to RAM 152. The contents of RAM 150 and 152 are a series of values whose amplitude distribution match a gaussian profile and whose PN sequence is long compared to the system impulse response time. The uncorrelated outputs of RAM 150 and 152 are multiplied by a gain factor also known as standard deviation 156 using multipliers 158 and 160 to generate AWGN OUT signal 161. By loading the RAM 150 and 152 with data values having a gaussian distribution by amplitude, the pseudo-random addresses provided by LFSR adder 146 will generate outputs of AWGN source 140 with a gaussian amplitude distribution. Gain module 154 varies the noise level through the standard deviation value in 156, thereby providing a noise source with an adjustable source of gain. The coefficient noise_sd may be determined from signal_power and SNR from the below equation:

$$\text{noise\_sd} = \sqrt{\frac{\text{Signal\_power}}{10^{0.1 \times SNR(dB)}}} \times 2^{17}$$

Figure 6:
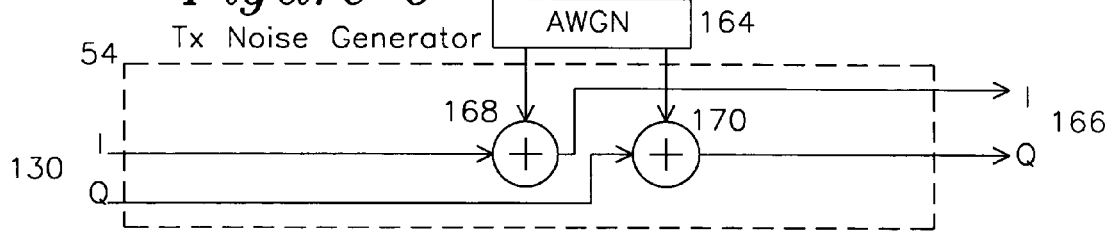
FIG. 6 shows the block diagram for a TX noise floor generator.

FIG. 6 shows the TX noise generator 54 of FIG. 1 implemented by summing the uncorrected outputs of AWGN source 164 of FIG. 5 with quadrature inputs 130 using adders 168 and 170 to produce the transmit noise generator output 166.

FIG. 7a shows the multi-path channel generator 56 of FIG. 1, which simulates the reflective and attenuative nature of the communications link, and may include any model which includes the effects of reflection, refraction, and scattering. The communications link 26 of FIG. 1 may include obstacles between transmitter antenna 16 and receiver antenna 18 which may result in reflection, refraction and scattering by obstacles along the path. The scattered signal will take different paths before reaching the receiver, which results in delay, phase and amplitude changes in the signal received at antenna 18. There may be hundreds of delayed signal replicas received, but not all of the received signals will have significant contributions in the detection of the signal. In simulation, the number of paths and signals received is limited. Two types of channels are presented herein: the JTC model and the Naftali model.

Figure 7B:
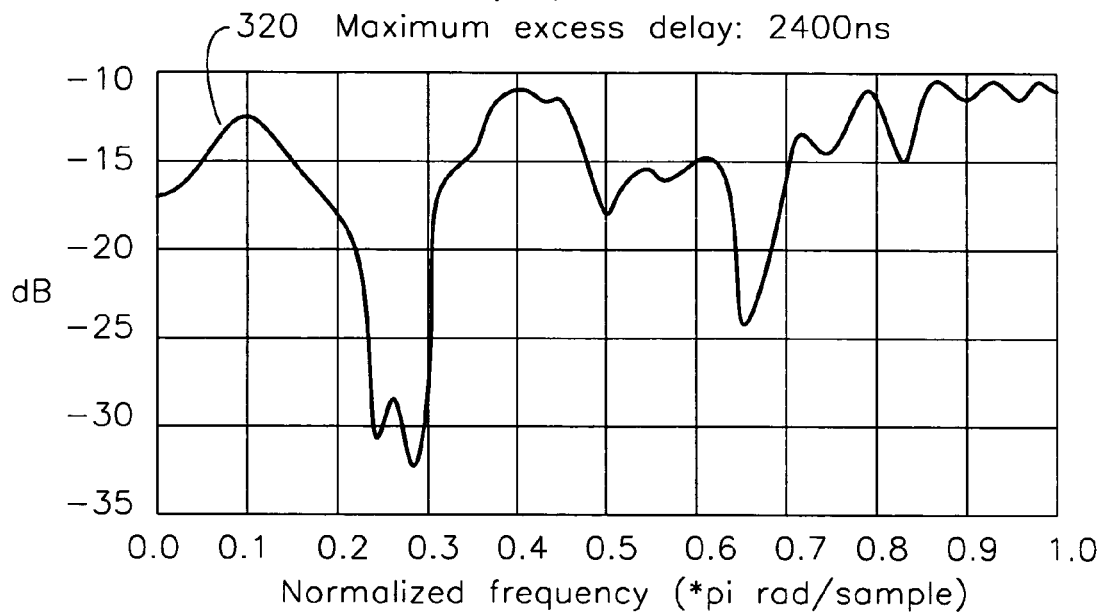
FIGS. 7*b* & 7*c* show the frequency transfer functions for two different channel simulations according to the multi-path generator of FIG. 7*a*.
Figure 7C:
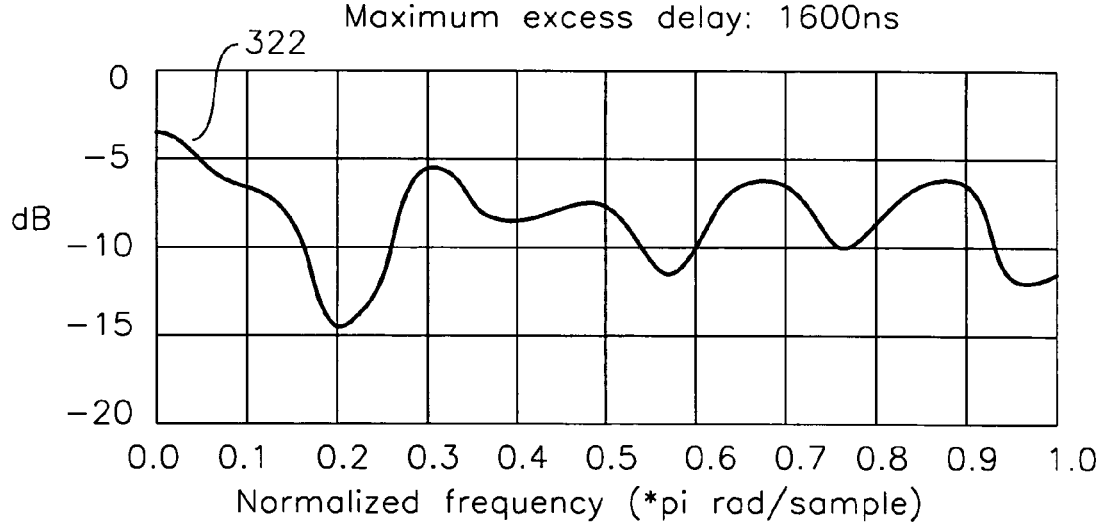

JTC models are standardized models with fixed coefficients, and Naftali models are programmable models derived by algorithms. The Naftali generalized multi-path channel model was adopted for IEEE 802.11, IEEE 802.11a, and IEEE 802.11b since a consistent channel model is required for comparison of different WLAN systems. The channel impulse response and frequency response for an indoor Naftali model is shown in FIGS. 7b and 7c. The channel impulse response is composed of complex samples with random uniformly distributed phase and Rayleigh distributed magnitude. The following equations generates channel impulse response:

$$h_k = \left(N\left(0, \frac{1}{2}\sigma k^2\right)\right) + i * \left(N\left(0, \frac{1}{2}\sigma k^2\right)\right)$$

$$\sigma_k^2 = \sigma_0^2 * \exp(-k * Ts/T_{RMS})$$

$$\sigma_0^2 = 1 - \exp(-Ts/T_{RMS})$$

$$\sigma_k^2 = \sigma_0^2 * \exp(-k*Ts/T_{RMS})$$

$$\sigma_0^2 = 1 - \exp(-Ts/T_{RMS})$$

Where:

N(0, x) is a is a zero mean Gaussian random variable with variance x;

Ts=Sampling interval and Trms is Root mean square value of Delay spread.

As an example, assuming Ts is 1/20 MHz=50 ns and Trms=16*Ts/2(pi)=128 ns. The impulse response for this example is shown in FIGS. 7b & 7c.

The JTC (Joint Technical Committee) model uses fixed FIR filter coefficients, which are described in detail in the Joint Technical Committee (JTC) "Technical Report on RF Channel Characterization and Deployment Modeling, Air Interface Standards", as published by the JTC in September 1994, and also described in the book "Wireless Information Networks", Wiley-Interscience; ISBN: 0471106070, New York, 1995. In one example of the fixed coefficient model from the JTC reference, the below table shows the FIR filter coefficients for one of the indoor residential models with an RMS delay spread of 150 ns:

| | INDOOR RESIDENTIAL C RMS Delay Spread = 150 ns | | | | |
|---|---|---|---|---|---|
| Tap | Delay (ns) | Delay n (n*1/88 M) | Avg Power (dB) | Avg Power (frac) | Voltage Gain |
| 1 | 0 | 0 | −4.6 | 0.3467 | 0.5889 |
| 2 | 50 | 4 | 0 | 1 | 1 |
| 3 | 150 | 13 | −4.3 | 0.3715 | 0.6095 |
| 4 | 225 | 20 | −6.5 | 0.2239 | 0.4731 |
| 5 | 400 | 35 | −3 | 0.5012 | 0.7079 |
| 6 | 525 | 46 | −15.2 | 0.0302 | 0.1738 |
| 7 | 750 | 66 | −21.7 | 0.0067 | 0.0822 |

The multi-path generator of FIG. 7a is a Finite Impulse Response (FIR) filter which recieves quadrature data from input 56, and the real and imaginary input data 56 is delayed through a series of elements shown as path0 RAM 306-1 through path10 RAM 306-11, and the path-delayed real and imaginary data is multiplied by delay dependant coefficients coef_i_0 and coef_q_0 for the respective real and imaginary components, and this is done for all all 11 delay taps with the final delay tap being path10 RAM 306-11 which is multiplied by coef_i_10 and coef_q_10, and all of the multiplied data results are summed in adder 310 to generate an output 172. In the multi-path generator of FIG. 7a, instead of using registers as storage elements as is known in the prior art, the FIR filter is realized using path0 RAM 306-1 through path10 RAM 306-11, where each path RAM acts as a variable length FIFO to provide a single tap with a variable length delay, and each variable length delay is cascaded in the form of path0 RAM 306-1 through path10 RAM 306-11. The delay from input to output of any particular RAM may be varied to include a short or long delay corresponding to a short or wide separation between reflecting elements in the multi-path scenario to be simulated, and these delays may optionally vary over time. In particular, it may be useful to provide a short interval delay in the first few path RAMs 306-1 and 306-2, and provide significantally longer delays in the last RAMs 306-10 and 306-11. In this manner of using RAMs 306-1 through 306-11 as delay elements, a long delay FIR with irregular delay spacings may be realized while using a small number of multipliers 308m-1 through 308m-11 and adder 310. Additionally, it may be useful to include a time-dependant channel behavior which includes the temporal effects of fading, and changing multi-path delays which vary over time. This may be accomplished by supplying time-varying values for coefficients 308i-1 and 308q-1 through 308i-11 and 308q-11. FIG. 7a only shows one possible configuration for realizing a non-periodic delay FIR filter, and may be generalized to use any type of storage shown as path0 RAM 306-1 or multiplier 308m-1 and adder 310, and may further be generalized to any number of stages.

Figure 8:
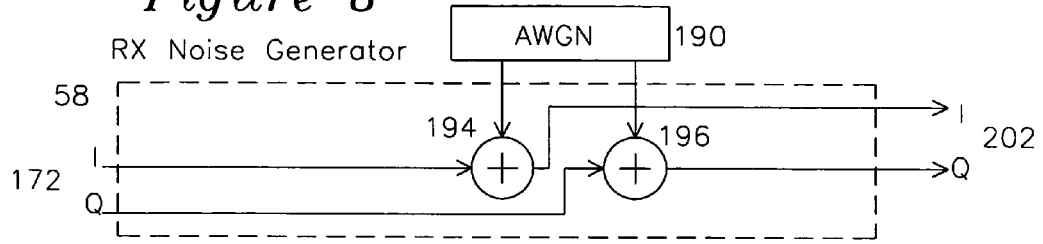
FIG. 8 shows the block diagram for an RX thermal noise generator.

FIG. 8 shows the RX thermal noise generator 58 of FIG. 2, and comprises a separate AWGN source 190 such as was described in FIG. 5, which adds simulated receiver noise using adders 194 and 196 which sum Rx thermal noise processor input 172 with AWGN source 190 to generate output 202. The noise power which is to be added is varied by the parameter noise_sd 156 of FIG. 5, as before, and may be derived from signal_power and SNR as:

$$\text{noise\_sd} = \sqrt{\frac{\text{Signal\_power}}{10^{0.1 \times SNR(\text{dB})}}} \times 2^{17}$$

Figure 9:
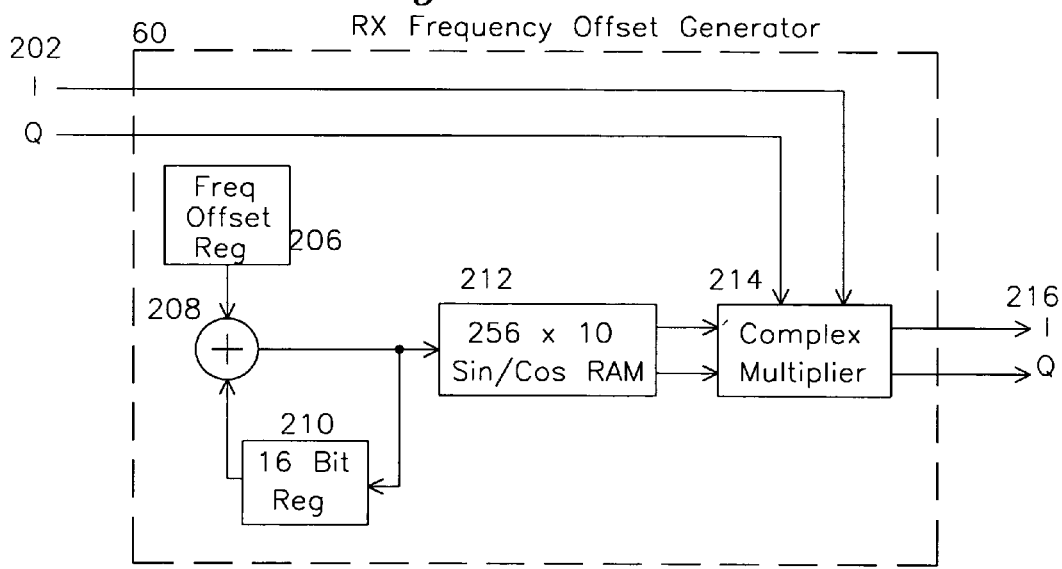
FIG. 9 shows the block diagram for an RX frequency offset generator.

FIG. 9 shows a frequency offset generator 200, which simulates the difference in frequency between a remote transmitter having an independent clock from the local receiver. The sum of a previous accumulated phase stored in register 210 and the value of the frequency offset register 206 is provided to a sine and cosine lookup table 212, which delivers these values to complex multiplier 214, which multiplies these values with the incoming offset generator input 202 to generate offset generator output 216. The coefficients may be determined as follows:

Where the transmitted signal is at frequency $F_c$, and the receiver oscillator's frequency is at $(F_c+\delta F)$, the RF mixer output will be $$A(t)[\exp(i4\pi F_c t + i2\pi \delta Ft) + \exp(i2\pi \delta Ft)]$$

The low pass signal component is $A(t)*\exp(i2\pi\delta Ft)$, which is the effect of frequency offset on the detected receiver signal.

The Values in RAM are calculated as shown below

Frequency offset (ppm)=(Frequency offset (Hz)
*10^6)/Center Frequency (Hz)

$$\text{freq\_offset\_ppm} = \frac{ppm \times \text{carrier frequency}}{10^6 \times samplerate} \times 2^{14}$$

Figure 10:
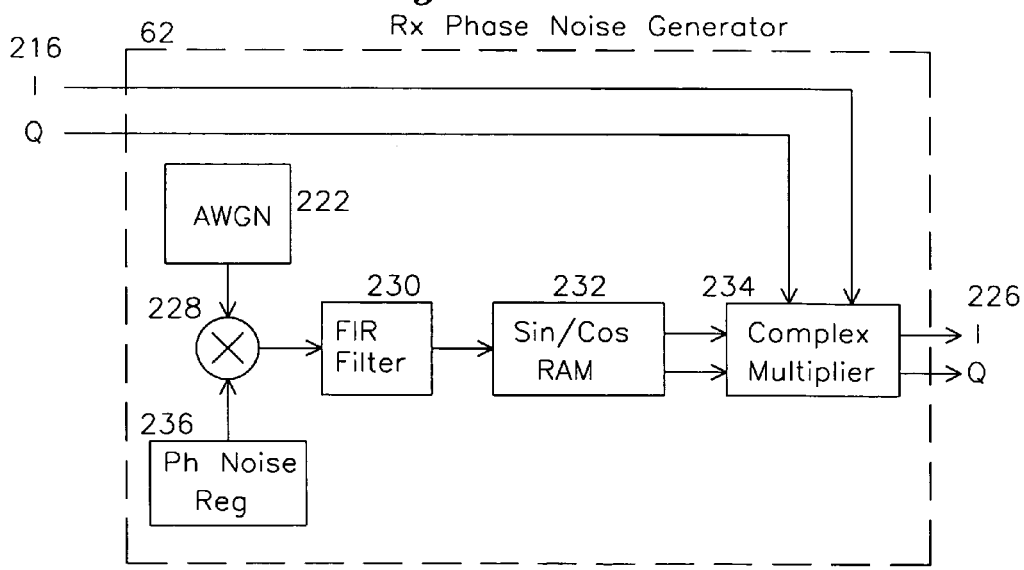
FIG. 10 shows the block diagram for an RX phase noise generator.

For example, if ppm=200, carrier frequency=2.4e9 and sample rate=40 MHz for IEEE 802.11a, then freq_offset_ppm=10'd196;

FIG. 10 shows a phase noise generator 62, which comprises an AWGN source 222 having an output stream multiplied by a value stored in a phase noise register 236, thereby generating an amplitude adjusted input to an FIR filter for shaping the frequency content of the noise source. The output of FIR 230 is provided to sine and cosine lookup tables stored in RAM 232, whose output is multiplied with the phase noise generator input 216 to generate a phase noise generator output 226. The origins of phase noise in a communications system are due to the finite bandwidth of the receiver local oscillator, where ideally the receiver local oscillator has a bandwidth of 0.

An amplitude and phase modulated sinusoidal signal can be written as $$V(t)=V_0[1+V_{am}(t)]\{\sin[2\lambda F_c t+\theta(t)]\}$$

where:

$V_0$=Amplitude of the signal
$F_c$=carrier frequency
$V_{am}$=The amplitude modulated component
$\theta(t)$=Phase modulated component To determine the effect of phase noise, we disregard the amplitude modulation component; as:

$$V(t)=V_0\{\sin[2\pi F_c t+\theta(t)]\}$$

$$\theta(t)=\delta f/f_m * \sin(2\pi F_m t) => \beta=\delta f/f_m$$

Which results in $$V(t)=V_0[\sin(2\pi F_c t)+\beta \sin(2\pi F_m t)]$$

where the second term is the phase noise term and is measured in dBc/Hz. The value of frequency offset reg (pn_equivalent_num) can be computed from:

$$\text{pn\_equivalent\_num}=\frac{1}{\sqrt{10^{phase\_noise(dBc/Hz)\times 0.1}}}>2\times\pi\times\text{phase\_freq\_offset}(Hz)\times 2^{13}$$

Figure 11:
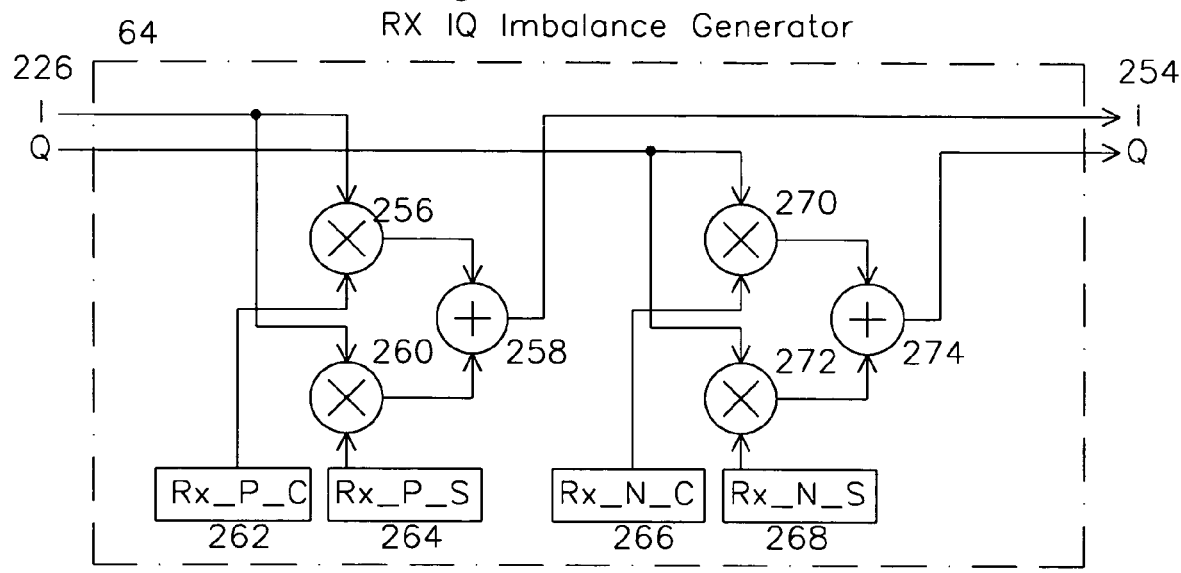
FIG. 11 shows the block diagram for a RX IQ Imbalance generator.

FIG. 11 shows the receiver IQ imbalance processor 64, which models imbalances between the I channel and Q channel, as were performed by FIG. 3 for the transmit IQ imbalance processor. The I and Q channels of the signal stream are ideally generated with a 90 degrees phase separation, and the I and Q channel gains are ideally gain matched to each other. The receive IQ imbalance generator 64 creates gain and phase imbalances which simulate the effects of gain and phase variances in the analog signal processing. The I signal from quadrature input signal 226 is applied to I channel multipliers 256 and 260, multiplied by imbalance generator coefficients Rx_Positive_Cosine 262 (Rx_P_C) and Rx_Positive_Sine 264 (Rx_P_S), and the multiplier 270 and 272 outputs are summed 274 to generate the I output of 254. Similarly, The Q quadrature input signal 64 is applied to Q channel multipliers 270 and 272, is multiplied by imbalance generator coefficients Rx_Negative_Cosine 266 (Rx_N_C) and Rx_Negative_Sine 268 (Rx_N_S), and the multiplier 270 and 272 outputs are summed 274 to generates Q output of 254. The values of coefficients RX_P_C 262, RX_P_S 264, RX_N_C 266, and RX_N_S 268 can be computed from values of Phase_imbalance and Gain_imbalance as follows:

rx_pos_cos_pos_gain =

$$\cos\left(\frac{\text{Phase\_imbalance}(deg)\times\pi}{360}\right)\times 10^{0.025\times\text{Gain\_imbalace(dB)}}\times 2^\wedge 6$$

rx_pos_sin_neg_gain =

$$\sin\left(\frac{\text{Phase\_imbalance}(deg)\times\pi}{360}\right)\times 10^{-0.025\times\text{Gain\_imbalace(dB)}}\times 2^\wedge 6$$

rx_neg_sin_pos_gain =

$$\sin\left(\frac{-\text{Phase\_imbalance}(deg)\times\pi}{360}\right)\times 10^{0.025\times\text{Gain\_imbalace(dB)}}\times 2^\wedge 6$$

rx_neg_cos_neg_gain =

$$\cos\left(\frac{-\text{Phase\_imbalance}(deg)\times\pi}{360}\right)\times 10^{-0.025\times\text{Gain\_imbalace(dB)}}\times 2^\wedge 6$$

Figure 12:
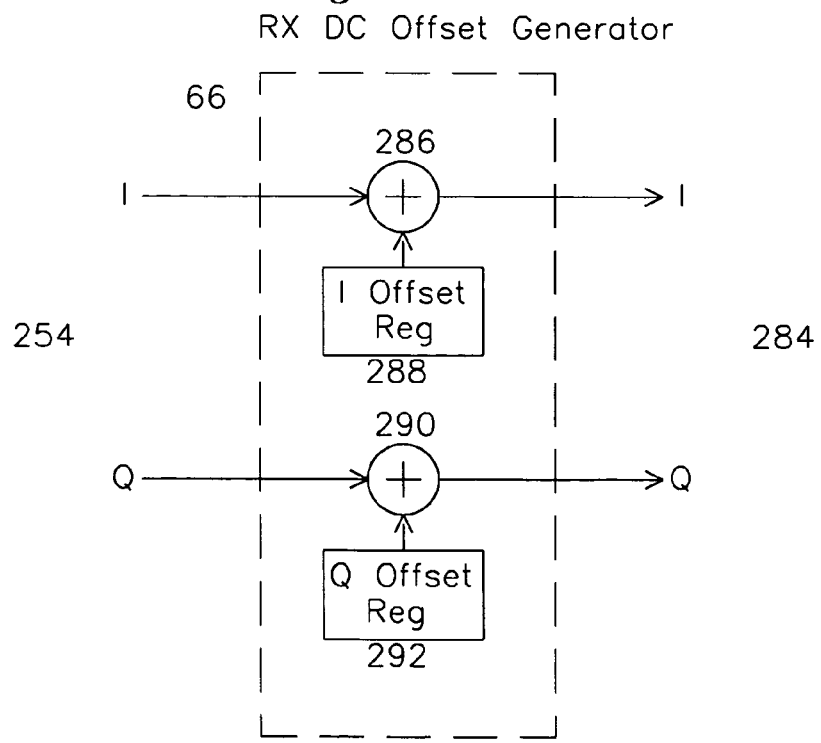
FIG. 12 shows the block diagram for an RX DC offset generator.

FIG. 12 shows a receiver DC offset generator 280, which adds fixed offsets to the I and Q channels using adders 286 and 290 and the values stored in I offset register 288 and Q offset register 292, respectively. This simulates the effect of DC offsets generated by the baseband converter 20 and ADC offsets of FIG. 1.

We claim:

1. A wireless link simulator receiving a digital quadrature input from a transmit device under test (TXDUT) and generating a quadrature digital output to a receive device under test (RXDUT), the link simulator comprising:

a transmit impairment processor coupled to the TXDUT and producing a transmit impairment processor output, said transmit impairment processor converting said digital quadrature input into an absolute value part and an angle part, the absolute value part coupled to a first multiplier which forms an output from said absolute value part multiplied by a first value derived from said absolute value part;

an adder having an output, said adder combining said angle part with a second value derived from said absolute value part;

a table generating a sine part and a cosine part for said adder output;

an I multiplier and a Q multiplier, said I multiplier forming an I output from a product of said first multiplier output and said table sine part, said Q multiplier forming a Q output from a product of said first multiplier output and said table cosine part;

a channel simulator coupled to said transmit impairment processor output and producing a channel simulator output;

a receive impairment processor coupled to said channel simulator and producing as output said quadrature digital output coupled to said RXDUT;

where said channel simulator includes at least one simulator multi-path channel.

2. The link simulator of claim 1 where said transmit impairment processor includes a transmit IQ imbalance generator responsive to a phase imbalance angle or a negative phase imbalance angle formed by inverting the sign of said phase imbalance angle for changing the phase of at least one said quadrature channel.

3. The link simulator of claim 2 where said transmit IQ imbalance generator forms an output I channel by summing the product of an input I channel multiplied by the cosine of said phase imbalance angle and said input I channel is multiplied by the sine of said phase imbalance angle.

4. The link simulator of claim 2 where said transmit IQ imbalance generator forms an output Q channel by summing the product of an input Q channel multiplied by the cosine of said negative phase imbalance angle and said input Q channel multiplied by the sine of said negative phase imbalance angle.

5. The link simulator of claim 1 where said transmit impairment processor includes a transmit noise floor generator having an output and an input, whereby said output is formed by adding Gaussian noise to said input.

6. The link simulator of claim 5 where said Gaussian noise is formed from data generated by a first memory having an address input and a data output, where a linear feedback shift register (LFSR) generates a pseudo-noise output coupled to said first memory address and said first memory contains data values which have a Gaussian amplitude distribution.

7. The link simulator of claim 6 where said LFSR output is inverted and coupled to a second memory address, said second memory data containing values which have a Gaussian amplitude distribution and are uncorrelated with said first memory values.

8. The link simulator of claim 1 where said channel simulator generates an I and Q output from an I and Q input by storing a plurality of previous said input I and Q values in a shift register, multiplying each said shift register I and Q values by coefficients specific to each said shift register, and forming said I and Q outputs by summing all said I multiplications and said Q multiplications, respectively, and for each new I and Q input value, and shifting in a new said I and Q value.

9. The link simulator of claim 8 where said coefficients are as described in the Joint Technical Committee (JTC) Technical Report on RF Channel Characterization and Deployment Modeling, Air Interface Standards.

10. The link simulator of claim 8 where said coefficients are Naftali coefficients.

11. The link simulator of claim 1 where said receive impairment processor includes a receive thermal noise generator having an output formed by adding Gaussian noise to said receive impairment processor input.

12. The link simulator of claim 11 where said receive noise generator is formed from a linear feedback shift register (LFSR) which generates a pseudo-noise output coupled to a first memory address, said first memory data having values which have a Gaussian amplitude distribution.

13. The link simulator of claim 12 where said LFSR output is inverted and coupled to a second memory address, said second memory data containing values which have a Gaussian amplitude distribution and are uncorrelated with said first memory values.

14. The link simulator of claim 1 where said receive impairment processor includes a frequency offset generator.

15. The link simulator of claim 14 where said frequency offset generator includes complex multiplier for forming an output by multiplying an input with a changing phase value.

16. The link simulator of claim 15 where said changing phase value is formed from adding a frequency offset register value to a value stored in a phase accumulation register, thereafter storing the resulting value in said phase accumulation register.

17. The link simulator of claim 1 where said receive impairment processor includes a receive phase noise generator.

18. The link simulator of claim 17 where said receive phase noise generator forms a quadrature output by multiplying a quadrature input by the sine and the cosine of a stream of filtered values, said filtered values formed by multiplying a stream of Gaussian noise source values with a phase noise register value, and filtering said multiplier output to form said filtered values.

19. The link simulator of claim 1 where said receive impairment processor includes a receive IQ imbalance generator responsive to an RX phase imbalance angle or a negative RX phase imbalance angle formed by inverting the sign of said phase imbalance angle.

20. The link simulator of claim 19 where said receive IQ imbalance generator forms an output I channel by summing the product of an input I channel multiplied by the cosine of said RX phase imbalance angle and said input I channel multiplied by the sine of said RX phase imbalance angle.

21. The link simulator of claim 19 where said receive IQ imbalance generator forms an output Q channel by summing the product of an input Q channel multiplied by the cosine of said negative RX phase imbalance angle and said input Q channel multiplied by the sine of said negative RX phase imbalance angle.

22. The link simulator of claim 1 where said receive impairment processor includes a receive DC offset generator for forming an output by adding a DC offset to an input.

23. The link simulator of claim 1 where said transmit impairment processor includes, in sequence:
 a transmit imbalance generator having as an input said TX-DUT and having an output which generates gain and phase imbalances from said input signal;
 a transmit non-linearity generator having an input coupled to said transmit imbalance generator output and generating an output which varies nonlinearly with said input;
 a transmit noise floor generator for forming an output by adding Gaussian noise to said transmit non-linearity generator output.

24. The link simulator of claim 1 where said receive impairment processor includes at least one of the following generators:
 a receive thermal noise generator for accepting a signal from said multi-path channel generator and generating an output signal by adding thermal noise to said input signal;
 a frequency offset generator coupled to said receive thermal noise generator output, said frequency offset generator for generating an output signal which has a frequency offset compared to said input signal;
 a phase noise generator for accepting said frequency offset generator output and adding phase noise to said input signal to produce an output signal;
 a receive IQ imbalance generator which accepts a quadrature input signal from said phase noise generator and introduces gain and phase imbalances to said input signal to produce an output signal;
 a DC offset generator which accepts said receiver IQ imbalance generator output and produces and output by adding a DC offset added to said input signal.

* * * * *